(12) United States Patent
Shih et al.

(10) Patent No.: US 7,241,408 B2
(45) Date of Patent: Jul. 10, 2007

(54) METHOD OF FABRICATING POLISHING PAD HAVING DETECTION WINDOW THEREON

(75) Inventors: Wen-Chang Shih, TaiChung (TW); Yung-Chung Chang, Taipei (TW); Min-Kuei Chu, Taichung (TW); Lung-Chen Wei, Taichung (TW)

(73) Assignee: I.V. Technologies Co., Ltd., Taichung (TW)

( * ) Notice: Subject to any disclaimer, the term of this patent is extended or adjusted under 35 U.S.C. 154(b) by 0 days.

(21) Appl. No.: 11/411,077

(22) Filed: Apr. 24, 2006

(65) Prior Publication Data

US 2006/0197249 A1 Sep. 7, 2006

Related U.S. Application Data

(63) Continuation of application No. 10/438,663, filed on May 14, 2003, now abandoned.

(30) Foreign Application Priority Data

Nov. 19, 2002 (TW) ................ 91133681 A

(51) Int. Cl.
*B29C 45/14* (2006.01)
(52) U.S. Cl. .................... 264/46.4; 264/271.1

(58) Field of Classification Search ............... 264/46.4, 264/271.1; 51/298, 299, 300; 451/527, 451/533, 548
See application file for complete search history.

(56) References Cited

U.S. PATENT DOCUMENTS

| 5,605,760 | A | 2/1997 | Roberts ................... 428/409 |
| 5,893,796 | A | 4/1999 | Birang et al. ............. 451/526 |
| 6,696,005 | B2 | 2/2004 | Strasbaugh ............... 264/263 |
| 6,832,950 | B2 | 12/2004 | Wright et al. ............. 451/490 |
| 6,875,077 | B2 | 4/2005 | Petroski et al. ............. 451/6 |
| 2001/0036805 | A1 | 11/2001 | Briang et al. ............. 451/527 |

*Primary Examiner*—Jill L. Heitbrink
(74) *Attorney, Agent, or Firm*—Ditthavong Mori & Steiner, P.C.

(57) ABSTRACT

The present invention provides a method of fabricating a polishing pad having a detection window thereon. A mold having a cavity therein and a transparent thermosetting plastic part that is incompletely hardened are provided. The transparent thermosetting plastic part is disposed in the mold and a high molecular weight foam is injected into the cavity of the mold. The transparent thermosetting plastic part and the high molecular weight foam are hardened at the same time. After the step of demolding is performed, a polishing pad having a detection window thereon is formed. Moreover, the transparent thermosetting plastic part can be designed to have the central portion thicker than its peripheral portion for preventing deformation that is caused by the material difference of the detection window and other portions of the polishing pad.

32 Claims, 4 Drawing Sheets

METHOD OF FABRICATING POLISHING PAD HAVING DETECTION WINDOW THEREON

CROSS-REFERENCE TO RELATED APPLICATION

This application is a continuation of application Ser. No. 10/438,663 filed on May 14, 2003, now allowed and abandoned, which claims the priority benefit of Taiwan application serial No. 91133681, filed on Nov. 19, 2002.

BACKGROUND OF THE INVENTION

1. Field of Invention

The present invention relates to a method of fabricating a polishing pad. More particularly, the present invention relates to a method of fabricating a polishing pad having a detection window thereon.

2. Description of Related Art

For the semiconductor manufacture of integrated circuits, it is necessary to increase the aspect ratios and the levels of conductive lines in order to increase density of electric components and reduce the production cost. For the wafer with multilevel metalization and/or high aspect ratios, it is complex and difficult to achieve good planarization. Chemical mechanical polishing (CMP) is so far one of the best technologies to achieve global planarization for very large semiconductor integration (VLSI) or even ultra large semiconductor integration (ULSI). This CMP technology was first proposed by the corporation IBM in the USA, and applied in the damascene fabrication of embedded conductive lines.

In general, chemical mechanical polishing relies on the relative movement between the resilient and hard polishing pad and the slurry (small particle suspension), acting on the surface of the wafer for planarization. While the polishing pad moves and presses on the surface of the wafer, the abrasive particles in the slurry are pressed to the surface of the wafer. The friction between the slurry particles and the wafer surface leads to abrasive action (loss) of the wafer, so that the uneven surface of the wafer is planarized and topology of the wafer is refined.

A transparent window is usually designed to be disposed within a specific area of the polishing pad for monitoring the polishing situations. The user can monitor the abrasive situation and control the polishing conditions through the transparent window and the platform setup. Therefore, the transparent window is regarded as the end-point detection of the polishing for the polishing pad.

The prior art method of fabricating the detection window is described in U.S. Pat. No. 5,605,760. In one embodiment, the polishing pad is a transparent sheet made of solid uniform polymer. Alternatively, the polishing pad is opaque and has a transparent window. The transparent window is fabricated by casting a rod or plug of the transparent polymer. This transparent casting is either inserted into the opaque pad before molding or after molding. If the transparent casting is inserted into the polishing pad in mold, because the materials of the polishing pad and the transparent window are different, the contraction difference between the polishing pad and the transparent window may cause the transparent window to be distorted or deformed. Even if the transparent window is inserted into the cut of the polishing pad after molding, the incomplete contact between the polishing pad and the transparent window may cause slurry leakage, thus deteriorating the polishing quality of the wafer.

U.S. Pat. No. 5,893,796 discloses a polishing pad having a transparent window. The transparent window is fabricated by placing a solid transparent insert into the bulk molten polishing pad material, so that the window is integrally molded into the polishing pad. However, the transparent window is made of high polishing resistant materials, while the polishing pad is made of low polishing resistant materials. Therefore, the polishing pad has a higher attrition rate, while the transparent window wears down (polished) at a lower rate, which creates height difference between the polishing pad and the detection window and causes cracking of the polishing pad around the transparent window. This height difference of the polishing pad further leads to non-uniform polishing on the wafer and defects on the surface of the wafer.

SUMMARY OF THE INVENTION

The present invention provides a method of fabricating the polishing pad having a detection window, which can improve the prior problems, such as distortion or warp, of the transparent window.

The present invention provides a method of fabricating the polishing pad having a detection window, for improving the slurry leakage problems resulting from in-complete contact between the polishing pad and the transparent window.

The present invention provides a method of fabricating the polishing pad having a detection window, which increases the polishing uniformity of the polishing pad having a detection window.

As embodied and broadly described herein, the present invention provides a mold having a cavity and a transparent thermosetting plastic part. The transparent thermosetting plastic part is not completely hardened. The parent thermosetting plastic part is made of a fully transparent high molecular weight material or a semi-transparent high molecular weight material, for example. The transparent thermosetting plastic part can be designed to be round, elliptical, tetragonal or in any other suitable shapes, from the top view. The side surface of the transparent thermosetting plastic part is designed to be an uneven and rugged surface. The transparent thermosetting plastic part is placed inside the cavity of the mold and a high molecular weight foam is injected into the cavity of the mold. The transparent thermosetting plastic part and the high molecular weight foam become completely hard (hardened) at the same time. The high molecular weight foam is, for example, a PU foam. The manufacturing method of the PU foam and related parameters have been disclosed in the Taiwanese Application No. 91117406 under the same inventors. After demolding, the polishing pad having the detection window is obtained. There is a uniform attrition (polishing) rate toward either the polishing pad or the detection window.

As embodied and broadly described herein, the present invention provides a mold having a cavity and a transparent thermosetting plastic part. The transparent thermosetting plastic part is not completely hardened. The parent thermosetting plastic part is made of a fully transparent high molecular weight material or a semi-transparent high molecular weight material, for example. The transparent thermosetting plastic part can be designed to be round, elliptical, tetragonal or in any other suitable shapes, from the top view. The side surface of the transparent thermosetting plastic part is designed to be an uneven and rugged surface. The transparent thermosetting plastic part is placed inside the cavity of the mold and a high molecular weight foam is injected into the cavity of the mold. The high molecular weight foam is hardened for a short period. The high molecular weight foam is, for example, a PU foam. The manufacturing method of the PU foam and related parameters have been disclosed in the Taiwanese Application No. 91117406 under the same inventors. Afterwards, a high molecular weight material layer is injected into the cavity and on the high molecular weight foam in the mold. The transparent thermosetting plastic part, the high molecular weight foam and the high molecular weight material layer become completely hardened (hard) at the same time. The high molecular weight material layer is made of, for example, polyurethane (PU), silicon rubber, polybutyl rubber (PBR), polyvinyl chloride (PVC) latex or polyacrylic acid series (PMMA) latex. In this embodiment, the high molecular weight foam has a hardness larger (higher) than that of the high molecular weight material layer, so that the high molecular weight material layer is used as a buffer layer. After demolding, the polishing pad having the detection window is obtained. There is a uniform attrition (polishing) rate toward either the polishing pad or the detection window.

As embodied and broadly described herein, the present invention provides a mold having a cavity and a transparent thermosetting plastic part. The transparent thermosetting plastic part is not completely hardened. The parent thermosetting plastic part is made of a fully transparent high molecular weight material or a semi-transparent high molecular weight material, for example. The transparent thermosetting plastic part can be designed to be round, elliptical, tetragonal or in any other suitable shapes, from the top view. The side surface of the transparent thermosetting plastic part is designed to be an uneven and rugged surface. The transparent thermosetting plastic part is placed inside the cavity of the mold and an incomplete reactive material is coated to the side surface of the thermosetting plastic part. The incomplete reactive material is a thermal adhesive, for example. A high molecular weight foam is injected into the cavity of the mold. The incomplete reactive material has a chemical reaction with the high molecular weight foam, so that the incomplete reactive material, the high molecular weight foam and the transparent thermosetting plastic part become hardened at the same time. The high molecular weight foam is, for example, a PU foam. The manufacturing method of the PU foam and related parameters have been disclosed in Taiwanese Application No. 91117406 under the same inventors. After demolding, the polishing pad having the detection window is obtained. There is a uniform attrition (polishing) rate toward either the polishing pad or the detection window.

In addition, the transparent detection window mentioned in the previous embodiments can be designed to have a curved bottom. In other words, the transparent detection window is thicker in the center and thinner in the rim. This design can help to eliminate the deformation resulting from the material variance of the polishing pad and the detection window.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

FIGS. 1-4 are cross-sectional views of the process steps for the manufacturing method of the polishing pad with a detection window according to one preferred embodiment of the present invention.

Figure 1:
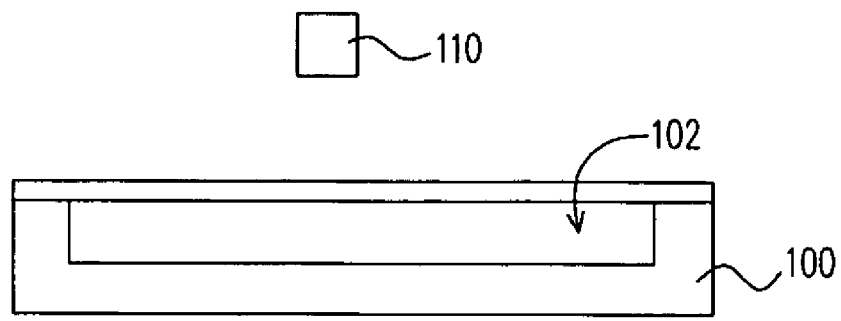
FIGS. 1-4 are display views of the process steps for the manufacturing method of the polishing pad with a detection window according to one preferred embodiment of the present invention.

Referring to FIG. 1, a mold 100 having a cavity 102 and a transparent thermosetting plastic part 110 are provided. So far, the transparent thermosetting plastic part 110 is not completely hardened. The parent thermosetting plastic part 110 is made of, for example, a fully transparent high molecular weight material or a semi-transparent high molecular weight material. For example, the material of the transparent thermosetting plastic part 110 is acrylic resin (PMMA), polyurethane (PU), polyvinyl chloride (PVC), epoxy resin or unsaturated polyester (UP). The transparent thermosetting plastic part 110 has a hardness ranging from 70 Shore A to 75 Shore D.

Figure 2:
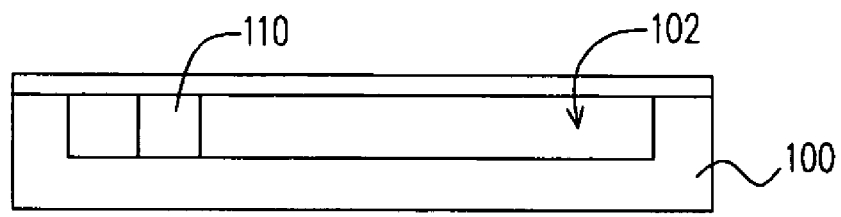

Referring to FIG. 2, the transparent thermosetting plastic part 110 is placed inside the cavity 102 of the mold 100. The bottom of the transparent thermosetting plastic part 110 is in tight contact to the bottom surface of the mold 100. The transparent thermosetting plastic part 110 is adhered to the mold 100, so as to increase the stability and accuracy for the following processes.

Figure 3:
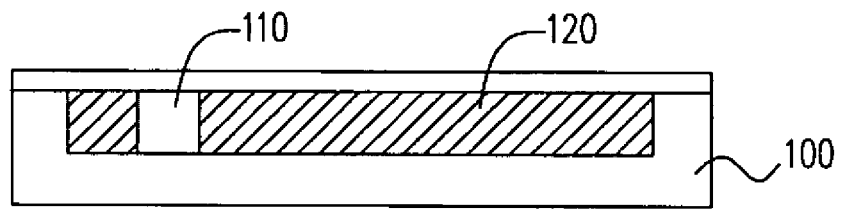

Referring to FIG. 3, a high molecular weight foam 120 is injected into the cavity 102 of the mold 100 by molding, so that the transparent thermosetting plastic part 110 is surrounded by the high molecular weight foam 120. The transparent thermosetting plastic part 110 and the high molecular weight foam 120 become completely hard (hardened) at the same time. In this embodiment, the injected high molecular weight foam 120 fills up the cavity 102. The high molecular weight foam 120 is, for example, a PU foam. The molding methods include thermoplastic injection-molding, thermosetting injection-molding (usually reaction injection-molding), thermoplastic or thermosetting injection blow-molding, thermo-extrusion molding or other similar methods.

Figure 5:
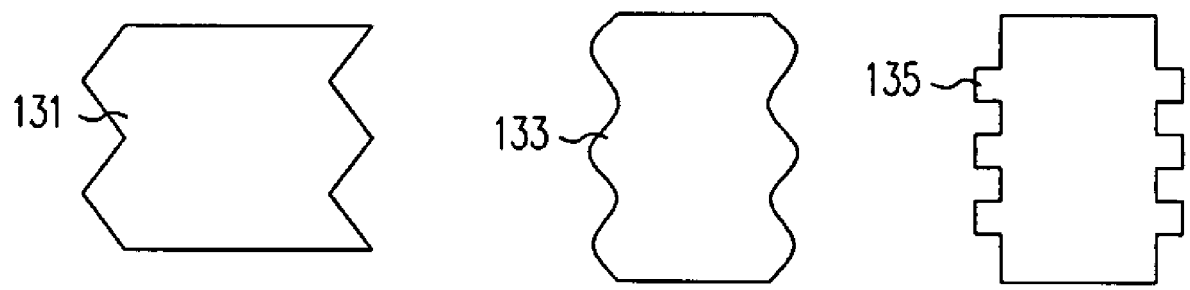
FIG. 5 is a display side view illustrating the shape of the side surfaces of the transparent thermosetting plastic part.

In order to make sure the transparent thermosetting plastic part 110 is in good (tight) contact with the high molecular weight foam 120, the side surface of the transparent thermosetting plastic part 110 is designed to be an uneven and rugged surface. From the side view (as shown in FIG. 5), the side surface of the transparent thermosetting plastic part 110 is, for example, in a serrated shape 131, in a wavy shape 133 or a toothed shape 135. Since the side surface of the transparent thermosetting plastic part 110 is uneven, the total contact area between the transparent thermosetting plastic part 110 and the high molecular weight foam 120 is increased, further strengthening the connection.

In addition, the transparent thermosetting plastic part 110 can be designed to be round, elliptical, tetragonal or in any other suitable shapes, from the top view. Preferably, the transparent thermosetting plastic part 110 is in an ellipsoid shape, from the top view.

Figure 4:
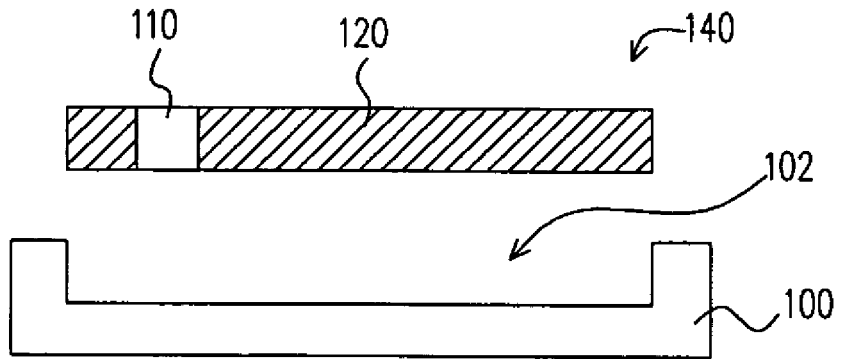

Referring to FIG. 4, after the transparent thermosetting plastic part 110 and the high molecular weight foam become completely hardened, demolding is performed to remove the polishing pad 140 from the mold 100. The transparent thermosetting plastic part 110 within the polishing pad 140 is used as a detection window. There is a uniform attrition (polishing) rate toward the whole polishing pad 140. That is, the high molecular weight foam 120 in the polishing pad 140 has a polishing rate equivalent to that of the detection window (transparent thermosetting plastic part 110).

Figure 6:
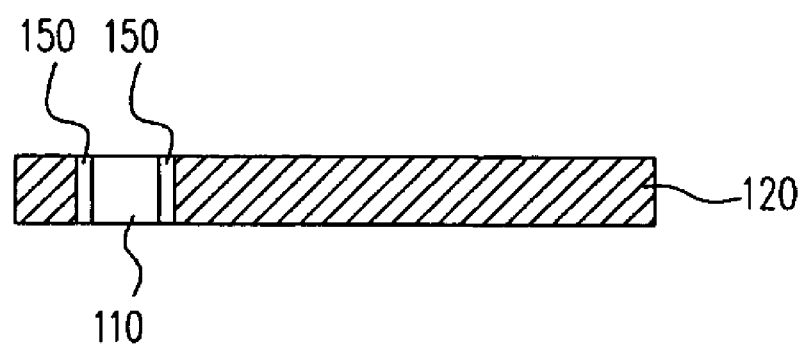
FIG. 6 is a display view illustrating the side surface of the transparent thermosetting plastic part, while the side surface is coated with an incomplete reactive material.

The method of the present invention further comprises coating an incomplete reactive material to the side surface of the transparent thermosetting plastic part 110, for strengthening the attachment of the transparent thermosetting plastic part 110 and the high molecular weight foam 120. The incomplete reactive material is, for example, a thermal adhesive 150, as shown in FIG. 6. Because of chemical bonding, the thermal adhesive 150 enhances adhesion of the transparent thermosetting plastic part 110 and the high molecular weight foam 120.

FIGS. 7-12 are cross-sectional views of the process steps for the manufacturing method of the polishing pad with a detection window according to another preferred embodiment of the present invention.

Figure 7:
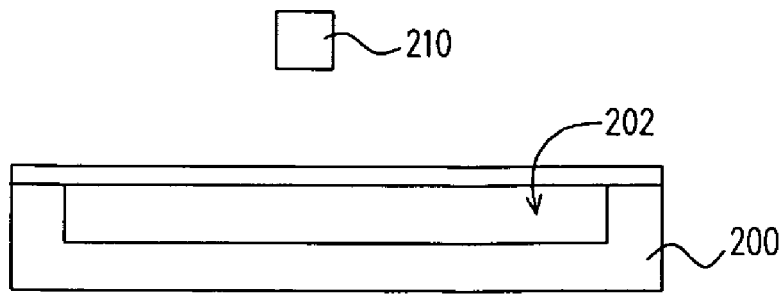
FIGS. 7-11 are display views of the process steps for the manufacturing method of the polishing pad with a detection window according to another preferred embodiment of the present invention.

Referring to FIG. 7, a mold 200 having a cavity 202 and a transparent thermosetting plastic part 210 are provided. So far, the transparent thermosetting plastic part 210 is not completely hardened. The parent thermosetting plastic part 210 is made of, for example, a fully transparent high molecular weight material or a semi-transparent high molecular weight material. For example, the material of the transparent thermosetting plastic part 210 is acrylic resin (PMMA), polyurethane (PU), polyvinyl chloride (PVC), epoxy resin or unsaturated polyester (UP). The transparent thermosetting plastic part 210 has a hardness ranging from 70 Shore A to 75 Shore D.

Figure 8:
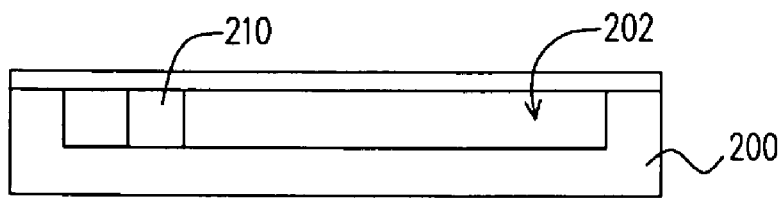

Referring to FIG. 8, the transparent thermosetting plastic part 210 is placed inside the cavity 102 of the mold 200. The bottom of the transparent thermosetting plastic part 210 is in tight contact to the bottom surface of the mold 200. The transparent thermosetting plastic part 210 is adhered to the mold 200, so as to increase the stability and accuracy for the following processes.

Figure 9:
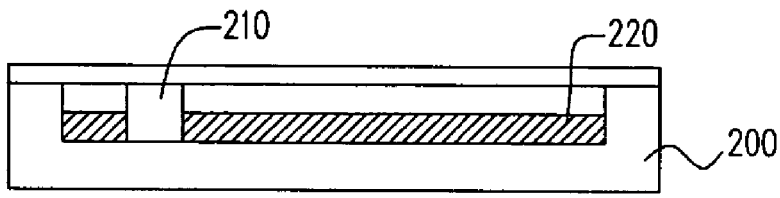

Referring to FIG. 9, a high molecular weight foam 220 is injected into the cavity 202 of the mold 200 by molding, so that the transparent thermosetting plastic part 210 is encircled by the high molecular weight foam 220 and the cavity 202 is partially filled by the high molecular weight foam 220. The high molecular weight foam 220 is hardened for about 3-5 minutes. In this embodiment, the high molecular weight foam 220 is, for example, a PU foam. The molding methods include thermoplastic injection-molding, thermosetting injection-molding (usually reaction injection-molding), thermoplastic or thermosetting injection blow-molding, thermo-extrusion molding or other similar methods.

Figure 10:
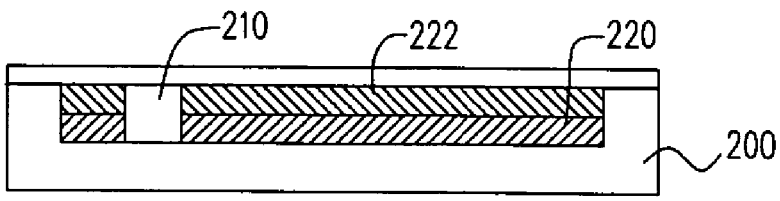

Referring to FIG. 10, a high molecular weight material layer 222 is injected into the cavity 202 and on the high molecular weight foam 220 in the mold 200 by molding. The transparent thermosetting plastic part 210 is also encircled by the high molecular weight material layer 222 and the cavity 202 is fully filled by the high molecular weight material layer 222. The transparent thermosetting plastic part 210, the high molecular weight foam 220 and the high molecular weight material layer 222 become completely hardened (hard) at the same time. In this embodiment, the high molecular weight foam 220 has a hardness larger (higher) than that of the high molecular weight material layer 222. Therefore, the high molecular weight material layer 222 is used as a buffer layer. The high molecular weight material layer 222 is made of, for example, polyurethane (PU), silicon rubber, polybutyl rubber (PBR), polyvinyl chloride (PVC) latex or polyacrylic acid series (PMMA) latex. The high molecular weight foam 220 has a hardness ranging from 30 Shore D to 80 Shore D, while the high molecular weight material layer 222 has a hardness ranging from 5 Shore A to 60 Shore A, for example. The molding methods include thermoplastic injection-molding, thermosetting injection-molding (usually reaction injection-molding), thermoplastic or thermosetting injection blow-molding, thermo-extrusion molding or other similar methods.

In order to make sure the transparent thermosetting plastic part 210 is in good (tight) contact to the high molecular weight foam 220 and the high molecular weight material layer 222, the side surface of the transparent thermosetting plastic part 210 is designed to be an uneven and rugged surface. From the side view, the side surface of the transparent thermosetting plastic part 210 is, for example, in a serrated shape 131, in a wavy shape 133 or a toothed shape 135 (as shown in FIG. 5). Since the side surface of the transparent thermosetting plastic part 210 is uneven, the total contact area between the transparent thermosetting plastic part 210, the high molecular weight foam 220 and the high molecular weight material layer 222 is increased, further strengthening the connection between the above three.

In addition, the transparent thermosetting plastic part 210 can be designed to be round, elliptical, tetragonal or in any other suitable shape, from the top view. Preferably, the transparent thermosetting plastic part 210 is in an ellipsoid shape, from the top view.

Figure 11:
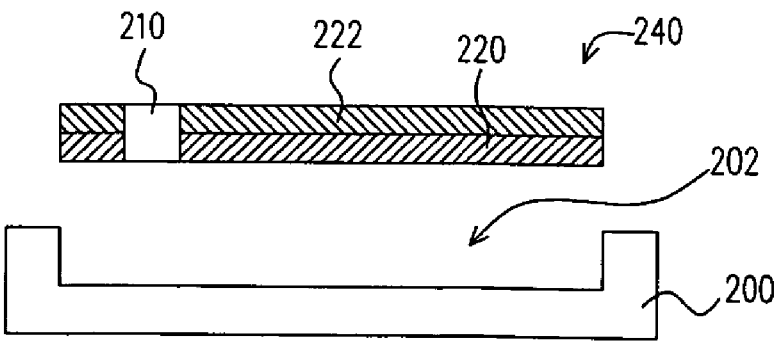

Referring to FIG. 11, after the transparent thermosetting plastic part 210, the high molecular weight foam 220 and the high molecular weight material layer 222 become completely hardened, demolding is performed to remove the polishing pad 240 from the mold 200. The transparent thermosetting plastic part 210 within the polishing pad 240 is used as a detection window. There is a uniform attrition (polishing) rate toward the whole polishing pad 240. That is, the high molecular weight foam 220 in the polishing pad 240 has a polishing rate equivalent to that of the detection window (transparent thermosetting plastic part 210).

Figure 12:
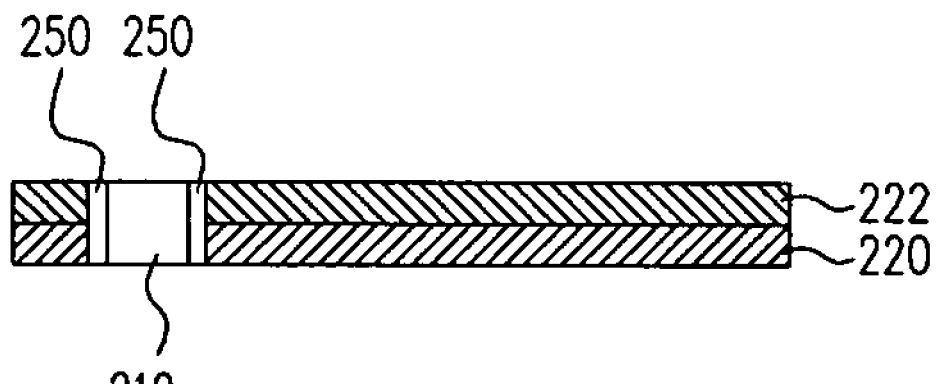
FIG. 12 is a display view illustrating the side surface of the transparent thermosetting plastic part, while the side surface is coated with an incomplete reactive material.

The method of the present invention further comprises coating an incomplete reactive material to the side surface of the transparent thermosetting plastic part 210, for strengthening the attachment of the transparent thermosetting plastic part 210, the high molecular weight material layer 222 and the high molecular weight foam 220. The incomplete reactive material is, for example, a thermal adhesive 250, as shown in FIG. 12. Because of the chemical bonding, the thermal adhesive 250 can enhance adhesion of the transparent thermosetting plastic part 210, the high molecular weight material layer 222 and the high molecular weight foam 220.

Figure 13:
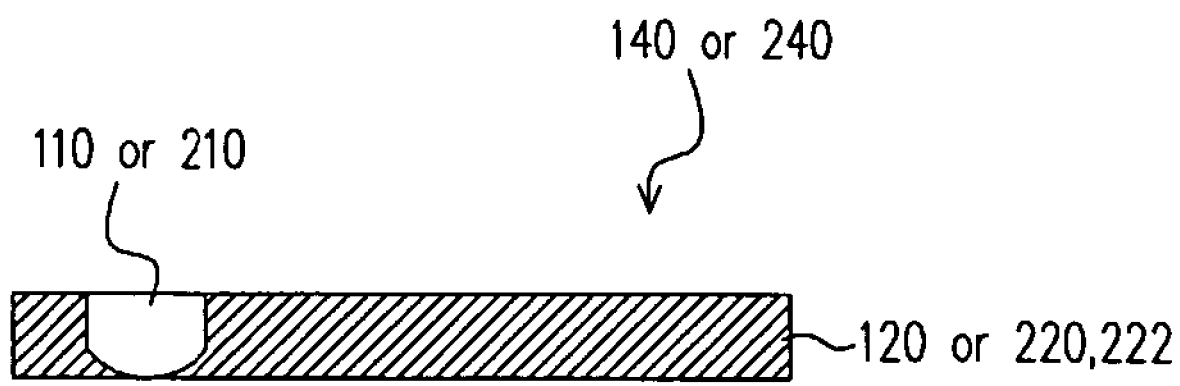
FIG. 13 is a display view illustrating the design of the thermosetting plastic part having a thicker center and a thinner border.

Furthermore, the transparent detection window 110, 210 mentioned in the previous embodiments can be designed to have a curved bottom (as shown in FIG. 13). In other words, the transparent detection window 110/210 is thicker in the center and thinner in the rim. This design can help to eliminate the deformation resulting from the material variance of the polishing pad 140/240 and the detection window 110/210.

In conclusion, the present invention has at least the following advantages:
1. Since the transparent thermosetting plastic part and the high molecular weight foam become hardened at the same time, the method of the present invention can lessen the distortion or deformation of the transparent thermosetting plastic part and the high molecular weight foam resulting from hardening at different time points. The method of the present invention for manufacturing the polishing pad having the detection window can increase planarity of the polishing pad.
2. The method of the present invention for manufacturing the polishing pad having the detection window further comprises coating an incomplete reactive material on the transparent thermosetting plastic part, in order to enhance adhesion of the transparent thermosetting plastic part and the polishing pad, so that the slurry will not leak from the cleavage between the transparent thermosetting plastic part and the polishing pad.
3. In the manufacturing method of the present invention, the side surface of the transparent thermosetting plastic part is designed to be uneven and rugged. Since the side surface of the transparent thermosetting plastic part is uneven, the total contact area between the transparent thermosetting plastic part and the high molecular weight foam is increased and the adhesion between the two is strengthened. The shape of the transparent thermosetting plastic part is adjustable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a polishing pad having a detection window thereon, comprising:
   providing a transparent thermosetting plastic part and a mold with a cavity, wherein the transparent thermosetting plastic part is not completely hardened and the profile of a side surface of the transparent thermosetting plastic part is an uneven surface selected from a group consisting of a serrated shape, a wavy shape and a toothed shape;
   placing the transparent thermosetting plastic part into the cavity of the mold;
   injecting a high molecular weight foam into the cavity of the mold, wherein the high molecular weight foam and the transparent thermosetting plastic part become completely hardened at the same time; and
   performing demolding to remove the mold, so as to obtain the polishing pad with the detection window.
2. The method of claim 1, wherein a material of the transparent thermosetting plastic part is selected from the following group consisting of a fully transparent high molecular weight material and a semi-transparent high molecular weight material.
3. The method of claim 1, wherein a material of the transparent thermosetting plastic part is selected from the following group consisting of acrylic resin (PMMA), polyurethane (PU), polyvinyl chloride (PVC), epoxy resin and unsaturated polyester (UP).
4. The method of claim 1, wherein the transparent thermosetting plastic part has a hardness ranging from 70 Shore A to 75 Shore D.
5. The method of claim 1, wherein the transparent thermosetting plastic part has a central portion thicker than a peripheral portion.
6. The method of claim 1, wherein the high molecular weight foam comprises a polyurethane foam.
7. The method of claim 1, wherein the transparent thermosetting plastic part has a shape selected from the following group consisting of round, elliptical and tetragonal.
8. The method of claim 1, wherein the polishing pad has an attrition rate equivalent to that of the detection window.
9. The method of claim 1, wherein a side surface of the transparent thermosetting plastic part is coated with a thermal adhesive.
10. A method of fabricating a polishing pad having a detection window thereon, comprising:
    providing a transparent thermosetting plastic part and a mold with a cavity, wherein the transparent thermosetting plastic part is not completely hardened and the profile of a side surface of the transparent thermosetting plastic part is an uneven surface selected from a group consisting of a serrated shape, a wavy shape and a toothed shape;
    placing the transparent thermosetting plastic part into the cavity of the mold;
    injecting a high molecular weight foam into the cavity of the mold;
    forming a high molecular weight material layer on the high molecular weight foam in the cavity of the mold, wherein the high molecular weight foam, the high molecular weight material layer and the transparent thermosetting plastic part become completely hardened at the same time; and
    performing demolding to remove the mold, so as to obtain the polishing pad with the detection window.
11. The method of claim 10, wherein a material of the transparent thermosetting plastic part is selected from the following group consisting of a fully transparent high molecular weight material and a semi-transparent high molecular weight material.
12. The method of claim 10, wherein a material of the transparent thermosetting plastic part is selected from the following group consisting of acrylic resin (PMMA), polyurethane (PU), polyvinyl chloride (PVC), epoxy resin and unsaturated polyester (UP).
13. The method of claim 10, wherein the transparent thermosetting plastic part has a hardness ranging from 70 Shore A to 75 Shore D.
14. The method of claim 10, wherein the transparent thermosetting plastic part has a central portion thicker than a peripheral portion.
15. The method of claim 10, wherein the high molecular weight foam comprises a polyurethane foam.
16. The method of claim 10, wherein a material of the high molecular weight material layer is selected from the following group consisting of polyurethane (PU), silicon rubber, polybutyl rubber (PBR), polyvinyl chloride (PVC) latex and polyacrylic acid series (PMMA) latex.

17. The method of claim 10, wherein the transparent thermosetting plastic part has a shape selected from the following group consisting of round, elliptical and tetragonal.

18. The method of claim 10, wherein the high molecular weight foam has a hardness larger than that of the high molecular weight material layer.

19. The method of claim 18, wherein the hardness of the high molecular weight foam ranges from 30 Shore D to 80 Shore D.

20. The method of claim 18, wherein the high molecular weight material layer has a hardness ranging from 5 Shore A to 60 Shore A.

21. The method of claim 10, wherein the polishing pad has an attrition rate equivalent to that of the detection window.

22. The method of claim 10, wherein a side surface of the transparent thermosetting plastic part is coated with a thermal adhesive.

23. A method of fabricating a polishing pad having a detection window thereon, comprising:
    providing a transparent thermosetting plastic part and a mold with a cavity, wherein the transparent thermosetting plastic part is not completely hardened;
    placing the transparent thermosetting plastic part into the cavity of the mold, wherein a side surface of the transparent thermosetting plastic part is coated with a thermal adhesive;
    injecting a high molecular weight foam into the cavity of the mold, wherein the thermal adhesive has chemical reactions with the high molecular weight foam, and wherein the thermal adhesive, the high molecular weight foam and the transparent thermosetting plastic part become completely hardened at the same time; and
    performing demolding to remove the mold, so as to obtain the polishing pad with the detection window.

24. The method of claim 23, wherein a material of the transparent thermosetting plastic part is selected from the following group consisting of a fully transparent high molecular weight material and a semi-transparent high molecular weight material.

25. The method of claim 23, wherein a material of the transparent thermosetting plastic part is selected from the following group consisting of acrylic resin (PMMA), polyurethane (PU), polyvinyl chloride (PVC), epoxy resin and unsaturated polyester (UP).

26. The method of claim 23, wherein the transparent thermosetting plastic part has a hardness ranging from 70 Shore A to 75 Shore D.

27. The method of claim 23, wherein the transparent thermosetting plastic part has a central portion thicker than a peripheral portion.

28. The method of claim 23, wherein the high molecular weight foam comprises a polyurethane foam.

29. The method of claim 23, wherein the transparent thermosetting plastic part has a shape selected from the following group consisting of round, elliptical and tetragonal.

30. The method of claim 23, wherein the side surface of the transparent thermosetting plastic part is an uneven surface.

31. The method of claim 30, wherein the side surface of the transparent thermosetting plastic part is configured to have a shape selected from the following group consisting of a serrated shape, a wavy shape and a toothed shape.

32. The method of claim 23, wherein the polishing pad has an attrition rate equivalent to that of the detection window.

* * * * *